(12) United States Patent
Unnimadhavan et al.

(10) Patent No.: US 10,135,729 B2
(45) Date of Patent: Nov. 20, 2018

(54) DISTRIBUTED GATEWAY FOR LOCAL SUBNET

(71) Applicant: Aruba Networks Inc., Sunnyvale, CA (US)

(72) Inventors: Sandeep Unnimadhavan, Bangalore (IN); Jagachittes Vadivelu, Bangalore (IN); Tilak Kumar Adhya, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 733 days.

(21) Appl. No.: 14/170,524

(22) Filed: Jan. 31, 2014

(65) Prior Publication Data

US 2015/0222540 A1    Aug. 6, 2015

(51) Int. Cl.
    *G06F 15/16*    (2006.01)
    *H04L 12/741*   (2013.01)
    *H04L 29/08*    (2006.01)

(52) U.S. Cl.
    CPC .............. *H04L 45/74* (2013.01); *H04L 67/10* (2013.01)

(58) Field of Classification Search
    CPC ...................................................... H04L 45/74
    USPC ........................................................ 709/224
    See application file for complete search history.

(56) References Cited

U.S. PATENT DOCUMENTS

| | | | |
|---|---|---|---|
| 6,397,260 B1* | 5/2002 | Wils ........................ | H04L 45/00 370/401 |
| 6,865,160 B1* | 3/2005 | Bare ....................... | H04L 12/185 370/256 |
| 7,881,208 B1* | 2/2011 | Nosella .............. | H04L 29/12028 370/220 |
| 9,055,076 B1* | 6/2015 | Sorenson, III ...... | H04L 67/1008 |
| 2002/0075844 A1* | 6/2002 | Hagen .................. | H04L 63/0442 370/351 |
| 2004/0114559 A1* | 6/2004 | Wang ................ | H04L 29/12216 370/338 |
| 2004/0153525 A1* | 8/2004 | Borella .................... | H04L 29/06 709/217 |
| 2004/0215752 A1* | 10/2004 | Satapati ............ | H04L 29/12386 709/223 |
| 2005/0025179 A1* | 2/2005 | McLaggan .............. | H04L 45/00 370/468 |

(Continued)

*Primary Examiner* — Kevin T Bates
*Assistant Examiner* — Ronak Patel
(74) *Attorney, Agent, or Firm* — Hewlett Packard Enterprise Patent Department

(57) ABSTRACT

A computer readable medium storing instructions with functionality for: receiving a first request, from a first client device in a particular IP subnet, to identify a MAC address that corresponds to a particular IP address in the particular IP subnet; transmitting a first response to the first client device that identifies a first MAC address, of a first network device in the particular IP subnet, as the MAC address that corresponds to the particular IP address; receiving a second request, from a second client device in the particular IP subnet, to identify the MAC address that corresponds to the particular IP address; transmitting a second response to the second client device that identifies a second MAC address, of a second network device in the particular IP subnet, as the MAC address that corresponds to the particular IP address, the second MAC address being different than the first MAC address.

20 Claims, 7 Drawing Sheets

(56) References Cited

U.S. PATENT DOCUMENTS

| | | | |
|---|---|---|---|
| 2006/0187873 A1* | 8/2006 | Friday | H04W 48/20 370/328 |
| 2007/0002833 A1* | 1/2007 | Bajic | H04L 29/1282 370/352 |
| 2008/0186968 A1* | 8/2008 | Farinacci | H04L 12/4633 370/392 |
| 2008/0293404 A1* | 11/2008 | Scherzer | H04W 84/18 455/426.1 |
| 2008/0316982 A1* | 12/2008 | Murty | H04W 48/02 370/338 |
| 2009/0042557 A1* | 2/2009 | Vardi | H04W 88/02 455/422.1 |
| 2009/0097454 A1* | 4/2009 | Yeou | H04W 28/22 370/332 |
| 2010/0107162 A1* | 4/2010 | Edwards | G06F 9/5077 718/1 |
| 2011/0274082 A1* | 11/2011 | Calhoun | H04W 40/24 370/331 |
| 2012/0014386 A1* | 1/2012 | Xiong | H04L 29/12028 370/392 |
| 2012/0163388 A1* | 6/2012 | Goel | H04L 12/4641 370/395.53 |

* cited by examiner

DISTRIBUTED GATEWAY FOR LOCAL SUBNET

BACKGROUND

Client devices within a company are generally connected to one another via a local subnet, and local subnets are connected to other networks by a gateway. Data addressed to computers outside the subnet is first directed to the gateway before sending the data out to the target computer. Each client device on the local subnet is configured with the internet protocol (IP) address of the local subnet gateway.

Some modern networks include network devices that act as both access points and gateways. In these local subnets, one of the network devices is chosen to operate as the gateway. Consequently, the local subnet is limited by the capabilities of the chosen network device. Further, as local subnets grow in size, these network devices may begin to receive more data than the device is able to processes efficiently.

OVERVIEW

In general, in one aspect, embodiments relate to a non-transitory computer readable medium comprising instructions which, when executed by one or more devices, causes performance of operations. The operations comprise: receiving a first request, from a first client device in a particular IP subnet, to identify a Media Access Control (MAC) address that corresponds to a particular Internet Protocol (IP) address in the particular IP subnet; transmitting a first response to the first client device that identifies a first MAC address, of a first network device in the particular IP subnet, as the MAC address that corresponds to the particular IP address; receiving a second request, from a second client device in the particular IP subnet, to identify the Media Access Control (MAC) address that corresponds to the particular Internet Protocol (IP) address; transmitting a second response to the second client device that identifies a second MAC address, of a second network device in the particular IP subnet, as the MAC address that corresponds to the particular IP address, the second MAC address being different than the first MAC address.

In general, in one aspect, embodiments relate to a system. The system comprises: one or more devices; the system being configured to perform operations comprising: receiving a first request, from a first client device in a particular IP subnet, to identify a Media Access Control (MAC) address that corresponds to a particular Internet Protocol (IP) address in the particular IP subnet; transmitting a first response to the first client device that identifies a first MAC address, of a first network device in the particular IP subnet, as the MAC address that corresponds to the particular IP address; receiving a second request, from a second client device in the particular IP subnet, to identify the Media Access Control (MAC) address that corresponds to the particular Internet Protocol (IP) address; transmitting a second response to the second client device that identifies a second MAC address, of a second network device in the particular IP subnet, as the MAC address that corresponds to the particular IP address, the second MAC address being different than the first MAC address.

In general, in one aspect, embodiments relate to a method. The method comprises: receiving a first request, from a first client device in a particular IP subnet, to identify a Media Access Control (MAC) address that corresponds to a particular Internet Protocol (IP) address in the particular IP subnet; transmitting a first response to the first client device that identifies a first MAC address, of a first network device in the particular IP subnet, as the MAC address that corresponds to the particular IP address; receiving a second request, from a second client device in the particular IP subnet, to identify the Media Access Control (MAC) address that corresponds to the particular Internet Protocol (IP) address; transmitting a second response to the second client device that identifies a second MAC address, of a second network device in the particular IP subnet, as the MAC address that corresponds to the particular IP address, the second MAC address being different than the first MAC address.

Other aspects will be apparent from the following description and the appended claims.

DETAILED DESCRIPTION

Figure 1:
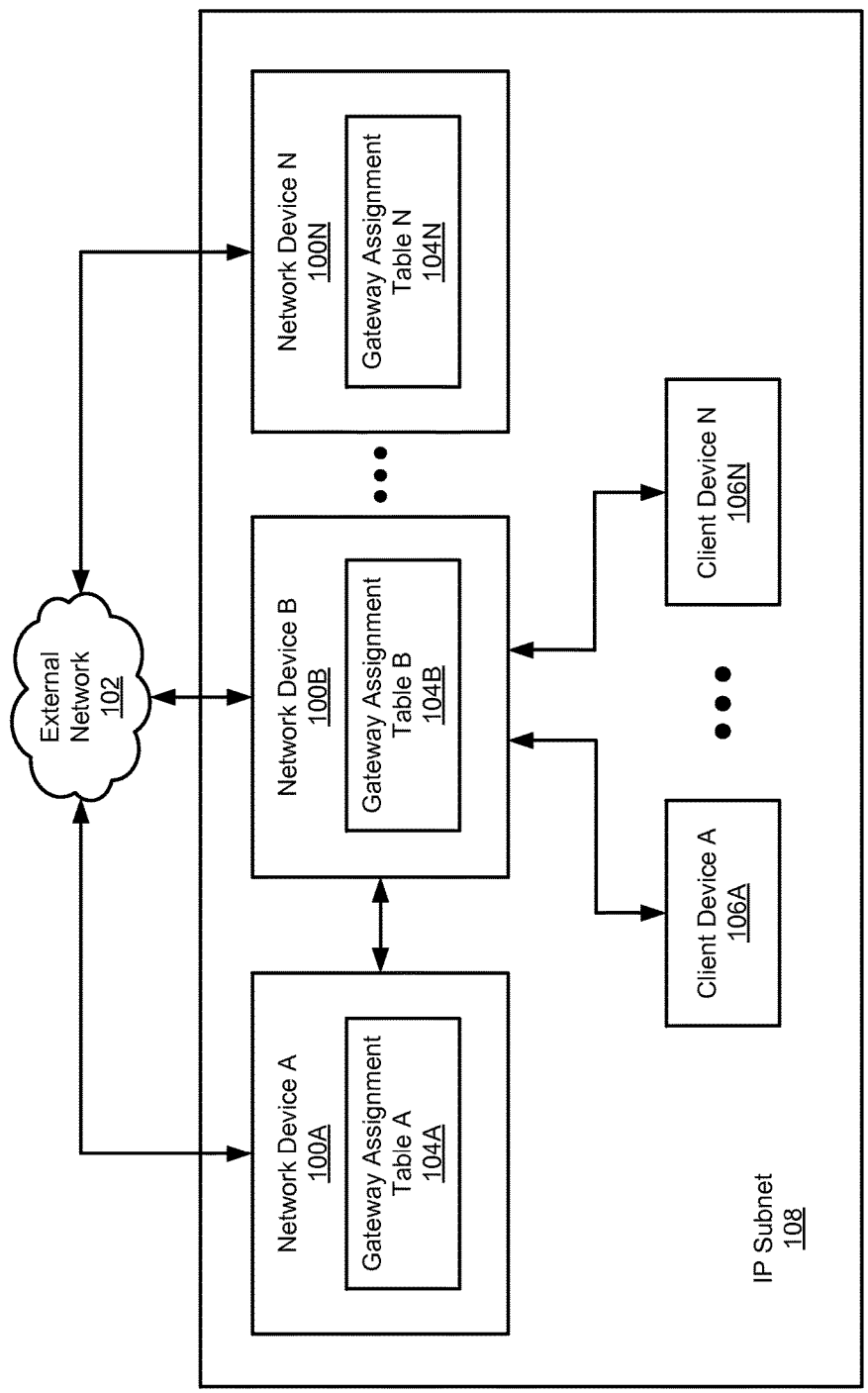
FIG. 1 shows a system in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In general, embodiments provide a method and system for assigning different gateways to client devices connected to the same network device. Embodiments be used to distribute gateway traffic by maintaining gateway assignments for client devices across access points.

Local subnets may include network devices that act as access points, gateways, controllers, or any combination thereof. Access points provide subnet access to connected client devices. Gateways connect network devices and client devices on a subnet to an external network, such as the Internet. Gateways may further provide network address translation (NAT) services to client devices. Clients that join a subnet are configured with an internet layer address (such as an IP address) of the subnet gateway. A client device that wants to send data to an external network first determines the link layer address (such as a media access control (MAC) address) of the gateway by sending an address resolution protocol (ARP) request to the access point (or network device operating as an access point). The access point responds with the link layer address of the gateway. Generally, the gateway IP address is the same for each client device on the subnet, and each access point responds to gateway ARP requests with different gateway MAC address.

In one or more embodiments, client devices on a local subnet are initially assigned to a specific gateway (or network device operating as a gateway), and continue to use the initially assigned gateway while roaming between access points. In one or more embodiments, client devices that roam between access points may continue to use the initially assigned gateway. Further, in one or more embodiments, a client device that initially connects to a network device/gateway that is currently receiving a high amount of network traffic may be initially assigned to a different network device/gateway. In order to ensure that client devices maintain their assigned gateway when moving between access points, each network device stores the assigned gateway for each client device connected to that network device.

FIG. 1 shows a diagram of a system in accordance with one or more embodiments. As shown in FIG. 1, multiple network devices (network device A (100A), network device B (100B), network device N (100N)) are communicatively coupled to an external network (102). Each network device (network device A (100A), network device B (100B), network device N (100N)) includes a gateway assignment table (gateway assignment table A (104A), gateway assignment table B (104B), gateway assignment table N (104N)). Network device B (100B) is communicatively coupled to multiple client devices (client device A (106A), client device N (106N)). The network devices (network device A (100A), network device B (100B), network device N (100N)) and client devices (client device A (106A), client device N (106N)) make up part of the IP subnet (108).

In one or more embodiments, each network device (network device A (100A), network device B (100B), network device N (100N)) includes functionality to facilitate communication between client devices (client device A (106A), client device N (106N)) and other devices connected to the network devices (network device A (100A), network device B (100B), network device N (100N)) and the external network (102). In one or more embodiments, each network device (network device A (100A), network device B (100B), network device N (100N)) may include functionality to operate as an access point, gateway, controller, or any combination thereof. Further, in one or more embodiments, each network device (network device A (100A), network device B (100B), network device N (100N)) may also provide NAT services to the client devices.

In one or more embodiments, each network device (network device A (100A), network device B (100B), network device N (100N)) may be assigned network addresses allowing client devices (client device A (106A), client device N (106N)) to appropriately direct network traffic. Further, each network device may be assigned one or more addresses at one or more layers of the internet protocol suite. In one or more embodiments, a network device (network device A (100A), network device B (100B), network device N (100N)) may be assigned an internet layer address (such as an IP address). Further, each network device (network device A (100A), network device B (100B), network device N (100N)) may also be associated with one or more link layer addresses (such as a MAC address).

In one or more embodiments, a network device (network device A (100A), network device B (100B), network device N (100N)) includes functionality to operate as an access point and provides client devices (client device A (106A), client device N (106N)) access to other devices on the IP subnet (108). Such access may be wireless access and/or wired access. Further, network devices (network device A (100A), network device B (100B), network device N (100N)) may also include functionality to authenticate client devices (client device A (106A), client device N (106N)) for access to a network. In one or more embodiments, each network device (network device A (100A), network device B (100B), network device N (100N)) includes functionality to maintain network access for a client device (client device A (106A), client device N (106N)) that initially connected to a different network device (network device A (100A), network device B (100B), network device N (100N)).

In one or more embodiments, a network device (network device A (100A), network device B (100B), network device N (100N)) provides a gateway IP address to each client device for which the network device (network device A (100A), network device B (100B), network device N (100N)) provides access. In one or more embodiments, each network device (network device A (100A), network device B (100B), network device N (100N)) in the IP subnet (108) instructs each client device (client device A (106A), client device N (106N)) to use the same internet layer/IP address as the gateway address, regardless of which network device (network device A (100A), network device B (100B), network device N (100N)) is acting as the access point for that client device (client device A (106A), client device N (106N))).

In one or more embodiments, each network device (network device A (100A), network device B (100B), network device N (100N)) includes functionality to operate as a gateway and facilitate communication between client devices (client device A (106A), client device N (106N)) and devices outside of the IP subnet (108) connected to the external network (102). In one or more embodiments, traffic addressed to devices outside of the IP subnet (108) is first directed to a gateway (or a network device (network device A (100A), network device B (100B), network device N (100N)) functioning as a gateway) before being sent to the external network (102). In one or more embodiments, network devices operating as gateways also provide NAT services to its assigned client devices.

In one or more embodiments, the gateway assignment tables (gateway assignment table A (104A), gateway assignment table B (104B), gateway assignment table N (104N)) are data structures that include entries linking client device identifiers (such as client device IP addresses or MAC addresses) and MAC addresses of the network device (network device A (100A), network device B (100B), network device N (100N)) acting as a gateway for that client device (client device A (106A), client device N (106N)). In one or more embodiments, the gateway assignment tables (gateway assignment table A (104A), gateway assignment table B (104B), gateway assignment table N (104N)) are part of a system that receives queries with client device IP addresses or MAC addresses and returns the MAC address of the network device (network device A (100A), network device B (100B), network device N (100N)) assigned to that client device as a gateway.

In one or more embodiments, each client device (client device A (106A), client device N (106N)) is a user system implemented as a computing device with functionality to interact with the network devices (network device A (100A), network device B (100B), network device N (100N)). In one or more embodiments, each client device (client device A (106A), client device N (106N)) is a computer system used by a user to gain access to one or more other elements connected to the IP subnet (108) via network devices (network device A (100A), network device B (100B), network device N (100N)) and the external network (102). The client devices (client device A (106A), client device N (106N)) may include a network interface (not shown) used to send and receive messages to other devices. Examples of client devices (client device A (106A), client device N (106N)) include, but are not limited to, desktop computers, laptop computers, tablet computers, and smartphones.

In one or more embodiments, once authenticated for network access by a network device, the network device (operating as an access point) provides network information allowing the client device (client device A (106A), client device N (106N)) to function on the IP subnet (108). This network information may include a router IP address, a subnet mask, and a gateway IP address. In one or more embodiments, the same gateway IP address is given to each client device (client device A (106A), client device N (106N)) on the IP subnet (108) regardless of which network device (network device A (100A), network device B (100B), network device N (100N)) is acting as the access point for that client device.

Figure 2:
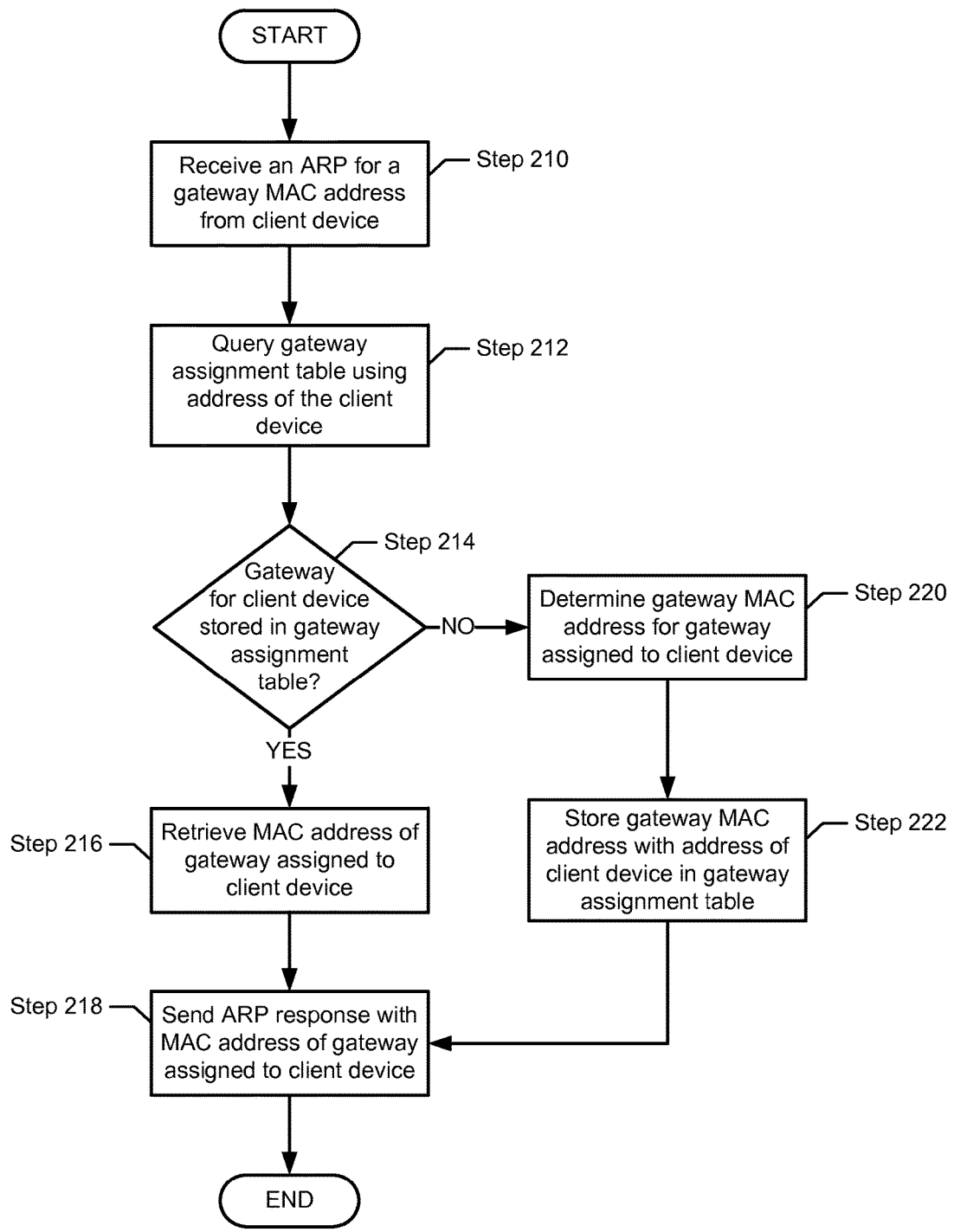
FIG. 2 shows a flow diagram in accordance with one or more embodiments.

FIG. 2 shows a flowchart for responding to an address resolution protocol (ARP) message in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 210, the network device receives an ARP request for a gateway MAC address from a client device. In one or more embodiments, the ARP request includes the gateway IP address provided to each client device on the IP subnet. In one or more embodiments, the ARP request also includes an identifier for the client device sending the ARP request, such as an IP address or MAC address of the client device.

In Step 212, the network device queries the gateway assignment table using the identifier of the client device. In Step 214, the network device determines whether a gateway for the client device is stored in the gateway assignment table. If in Step 214, the gateway assignment table includes an entry for the client device, then in Step 216, the network device retrieves the MAC address of the network device assigned as a gateway for the client device. In Step 218, the network device sends an ARP response to the client device with the MAC address of the network device assigned as a gateway for the client device.

If in Step 214, the gateway assignment table does not include an entry for the client device, then in Step 220, the network device determines a MAC address for a network device assigned to act as a gateway for the client device. In one or more embodiments, if the gateway assignment table for the network device does not include an entry for the client device, the client device may be connecting to the IP subnet for the first time or has recently roamed from another access point. In Step 222, the network device stores the MAC address of the network device assigned to act as a gateway for the client device in the gateway assignment table. Details about Step 220 and Step 222 is provided in FIG. 3.

Figure 3:
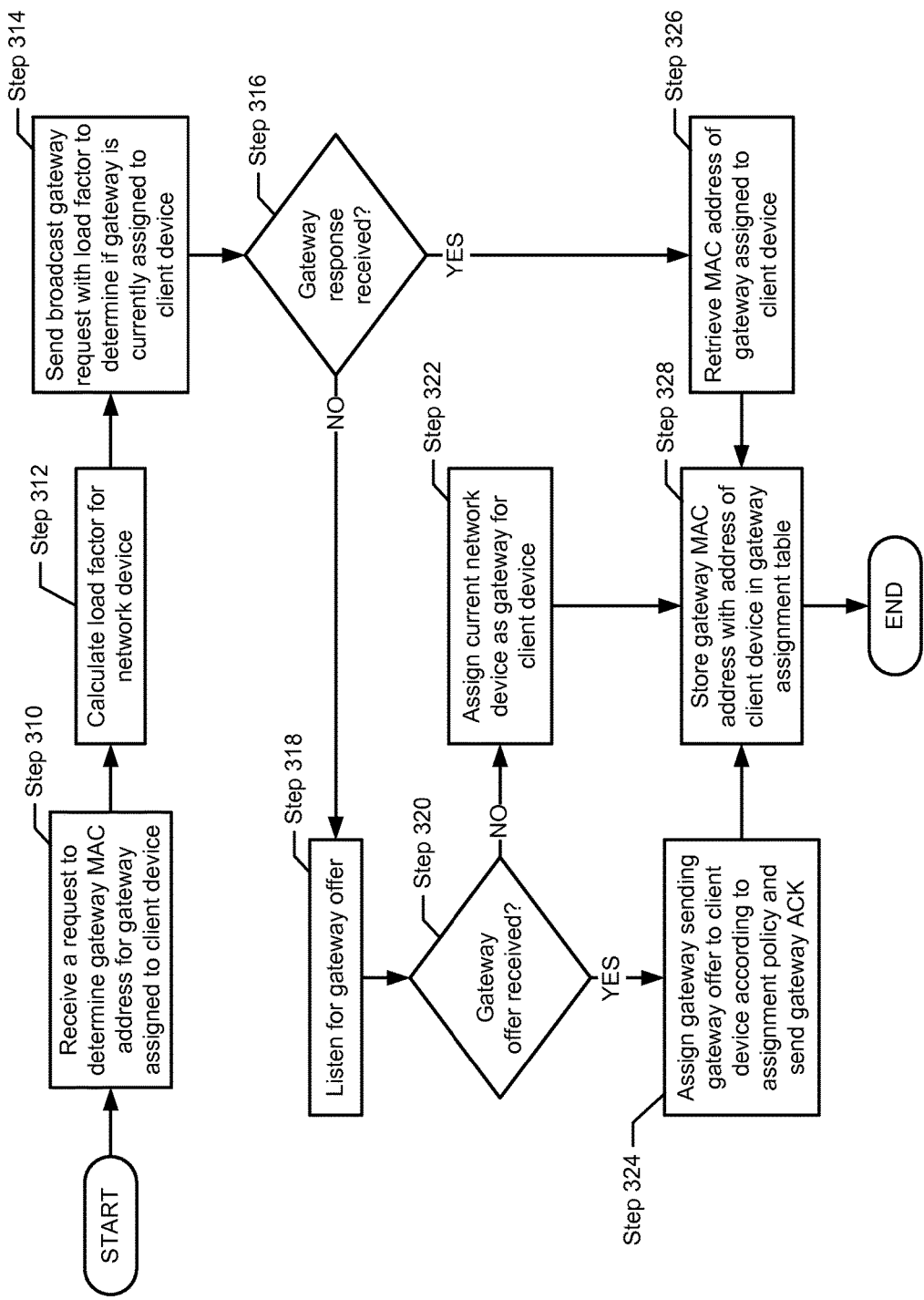
FIG. 3 shows a flow diagram in accordance with one or more embodiments.

FIG. 3 shows a flowchart for determining a gateway MAC address for a client device in accordance with one or more embodiments. Specifically, FIG. 3 describes details of Step 220 and Step 222 in FIG. 2. While the various steps in the flowchart are presented and described sequentially, one of ordinary skill will appreciate that some or all of the steps may be executed in different orders, may be combined or omitted, and some or all of the steps may be executed in parallel.

In Step 310, the network device receives a request to determine a gateway MAC address for a client device. In one or more embodiments, this request is received by the network device itself to initiate the gateway MAC determination process.

In Step 312, the network device calculates the load factor for itself. In one or more embodiments, the load factor is a value indicating the amount of traffic currently handled by the network device. The value may be a measurement of, for example, the rate that data is processes through the network device or the current utilization of hardware resources on the network device. In one or more embodiments, the load factor is calculated using a combination of measurements.

In Step 314, the network device sends a broadcast gateway request with its own load factor to determine whether the client device is currently assigned a gateway. In one or more embodiments, the broadcast gateway request is received by other network devices on the IP subnet. In Step 316, the network device determines whether a gateway response has been received. In one or more embodiments, the network device waits for a period of time before determining that a gateway response has not been received.

If in Step 316, the network device does not receive a gateway response, then in Step 318, the network device listens for a gateway offer. In one or more embodiments, a gateway offer is an offer by another network device to act as a gateway for the client device. In one or more embodiments, the gateway offer includes the load factor of the network device sending the gateway offer.

In Step 320, the network device determines whether a gateway offer has been received. In one or more embodiments, the network device waits for a period of time before determining that a gateway offer has not been received. If in Step 320, the network device determines that a gateway offer has not be received, then in Step 322, the network device assigns itself as the gateway for the network device. If in Step 320, the network device receives a gateway offer, then in Step 324, the network device assigns a network device that sent a gateway offer as the gateway for the client device according to an assignment policy. In one or more embodiments, the gateway device employs a single waiting period for both gateway responses and gateway offers. Also in Step 324, in one or more embodiments, the network device sends a gateway acknowledgement (ACK) to the network device sending the gateway offer indicating that the gateway offer has been accepted.

In one or more embodiments, an assignment policy instructs network devices regarding assigning gateways to client devices. Specifically, the assignment policy dictates which network device to select as a gateway under a given set of circumstances. Examples of assignment policies include the following:

Lowest Load Factor Offered: The network device compares its own load factor to the load factors received in gateway offers and assigns the client device to the network device with the lowest load factor.

Load Factor Below Threshold: The network device only considers gateway offers from network devices with load factors less than 70% of the load factor of the current network device. The client device is assigned to the network device with the lowest load factor considered. If no gateway offers include load factors of less than 70% of the load factor of the current network device, then the current network device assigns itself as the gateway.

Nearest Underutilized Gateway: The network device only considers gateway offers from network devices within a certain network range of the current network device (using ping rate and/or knowledge of the physical configuration of the network). The client device is assigned to the network device with the lowest load factor considered. If no gateway offers are received from nearby network devices, or none of the considered gateway offers is below the load factor of the current network device, then the current network device assigns itself as the gateway.

If in Step 316, the network device receives a gateway response, then in Step 326, the network device retrieves the MAC address of the network device keyed to the client device from the responding network device. In Step 328, the network device stores the gateway MAC address of the responding network device with an identifier for the client device in the gateway assignment table.

Figure 4:
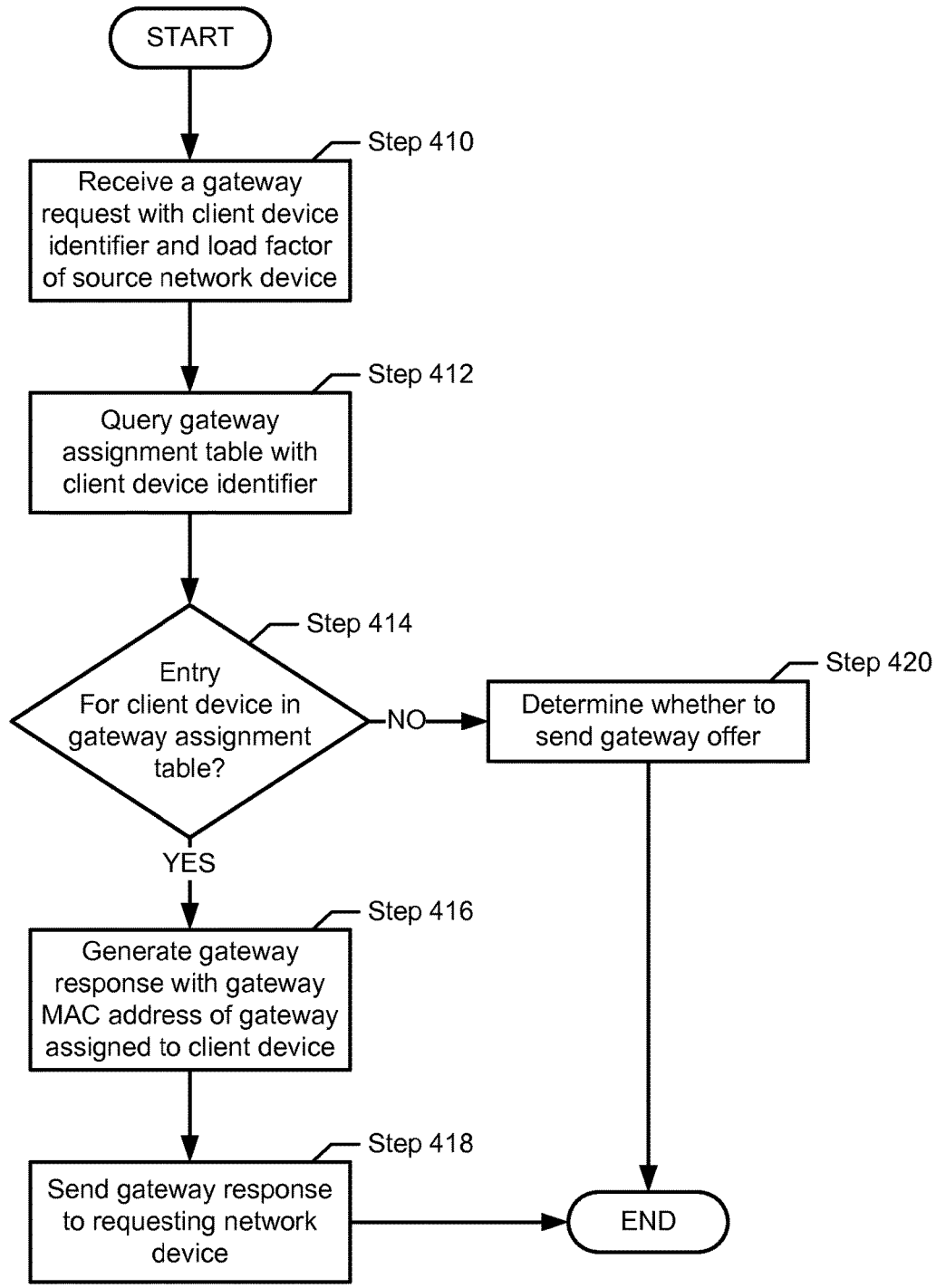
FIG. 4 shows a flow diagram in accordance with one or more embodiments.

FIG. 4 shows a flowchart for servicing a gateway assignment request in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 410, the network device receives a gateway request with a client device identifier (for example, an IP address or MAC address of the client device) and load factor of the requesting network device. In one or more embodiments, the gateway request is sent from another network device as described in FIG. 3.

In Step 412, the network device queries its gateway assignment table with the client device identifier to determine whether an entry exists for the client device. In Step 414, the network device determines whether an entry exists for the client device. If in Step 414, the network device determines that an entry exists for the client device, then in Step 416, the network device generates a gateway response with the entry in the gateway assignment table. In one or more embodiments, the gateway response includes the MAC address of the network device assigned as the gateway for the client device. In Step 418, the network device sends the gateway response to the requesting network device.

If in Step 414, the network device determines that no entry exists for the client device, then in Step 420, the network device determines whether to send a gateway offer. Details regarding Step 420 are provided in FIG. 5.

Figure 5:
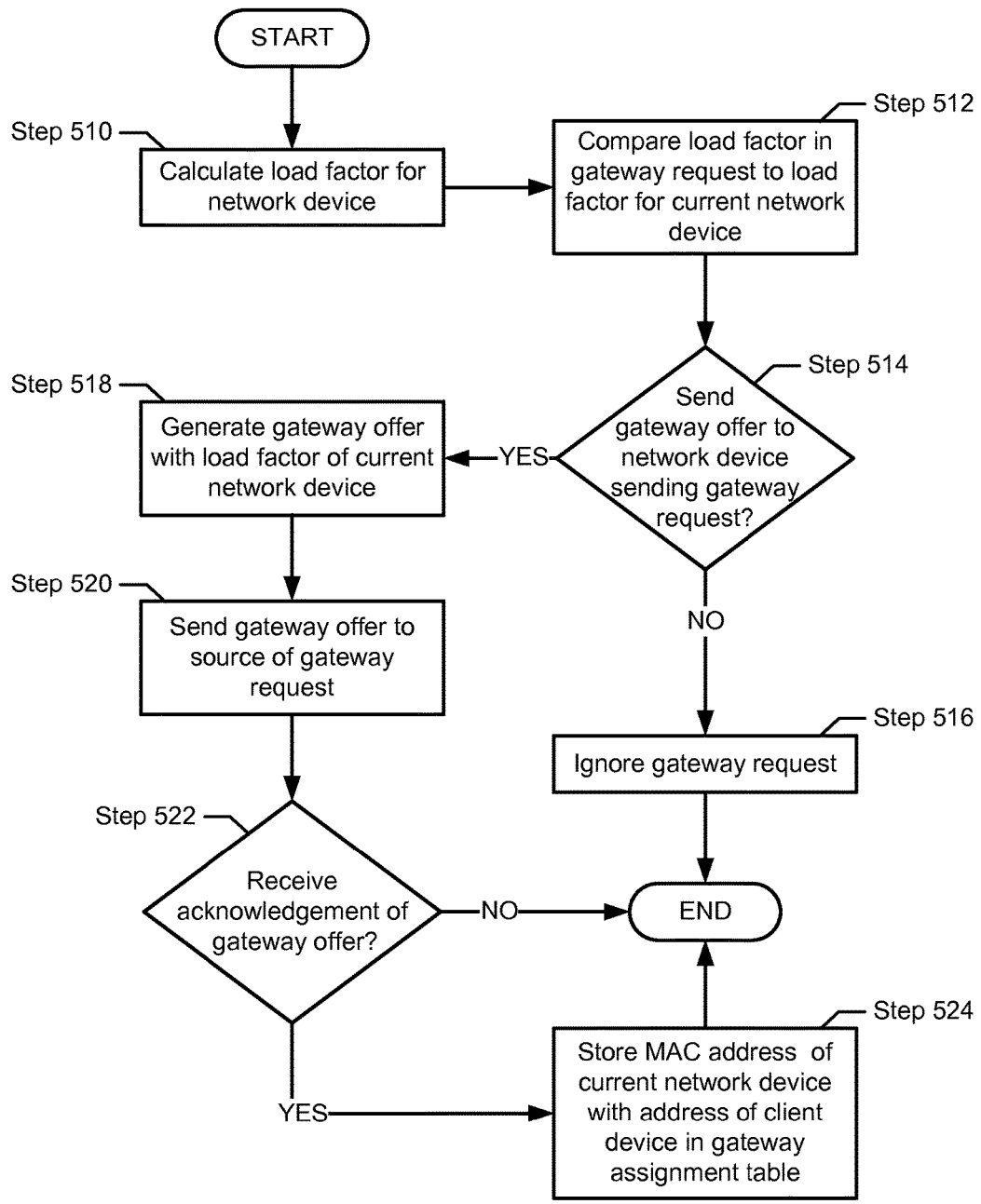
FIG. 5 shows a flow diagram in accordance with one or more embodiments.

FIG. 5 shows a flowchart for determining whether to send a gateway offer in accordance with one or more embodiments. Specifically, FIG. 5 describes details of Step 420 in FIG. 4. While the various steps in the flowchart are presented and described sequentially, one of ordinary skill will appreciate that some or all of the steps may be executed in different orders, may be combined or omitted, and some or all of the steps may be executed in parallel.

In Step 510, the network device calculates its own load factor. In one or more embodiments, the load factor is calculated as described above. In one or more embodiments, the load factor for each network device is calculated in the same manner to provide a useful comparison between the current states of different network devices.

In Step 512, the network device compares its own load factor to the load factor of the requesting network device. In Step 514, the network device determines whether to send a gateway offer to the requesting network device. In one or more embodiments, the determination regarding whether to send a gateway offer is made based on the results of the comparison. For example, a gateway offer may be sent when the load factor for the current network device is below the load factor for the requesting network device. In one or more embodiments, a gateway offer may be sent if the load factor of the requesting network device is less than a certain percentage of the load factor for the current network device. In one or more embodiments, the determination regarding whether to send a gateway offer is made according to an assignment policy. In one or more embodiments, no comparison is made and the network device sends its load factor automatically.

If in Step 514, the network device determines that a gateway offer should not be sent, then in Step 516, the network device ignores the gateway request.

If in Step 514, the network device determines that a gateway offer should be sent, then in Step 518, the network device generates a gateway offer with its own load factor. In one or more embodiments, the gateway offer also includes the MAC address of the current network device. In Step 520, the network device sends the gateway offer to the requesting network device.

In Step 522, the network device waits to receive a gateway acknowledgement. In one or more embodiments, a gateway acknowledgement indicates that the requesting network device has accepted the gateway offer sent by the current network device. If in Step 522, the network device does not receive a gateway acknowledgement, then no further action is taken. In one or more embodiments, the network device determines that a gateway acknowledgement has not been received after an amount of time has expired without receiving the gateway acknowledgement.

If in Step 522, the network device receives a gateway acknowledgement, then in Step 524, the current network device stores its own MAC address with an identifier of the client device in its own gateway assignment table.

Figure 6:
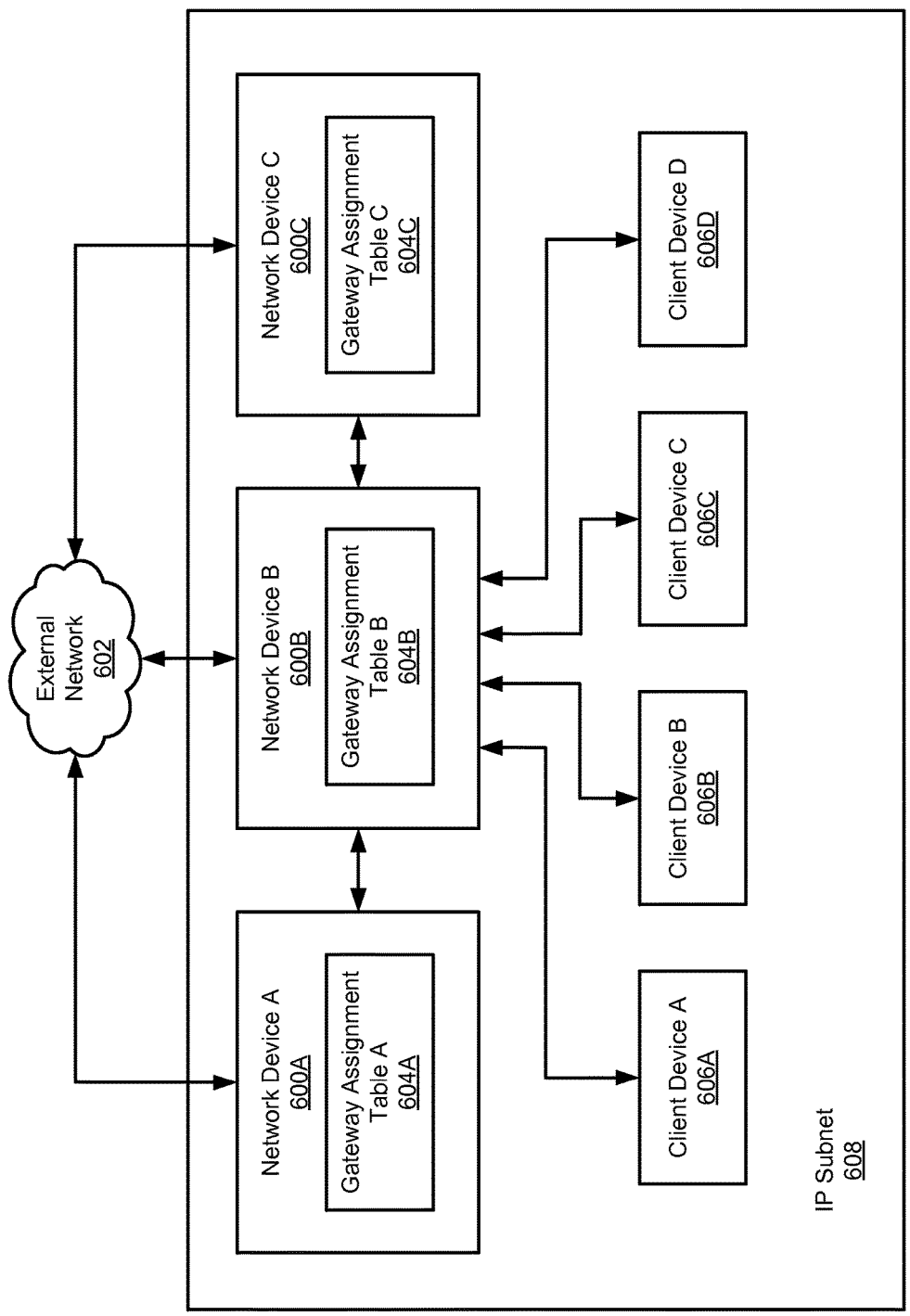
FIG. 6 shows an example in accordance with one or more embodiments.

FIG. 6 shows an example in accordance with one or more embodiments. As shown in FIG. 6, three network devices (network device A (600A), network device B (600B), network device C (600C)) are communicatively coupled to an external network (602). Each network device (network device A (600A), network device B (600B), network device C (600C)) includes a gateway assignment table (gateway assignment table A (604A), gateway assignment table B (604B), gateway assignment table C (604C). Network device B (600B) is communicatively coupled to four client devices (client device A (606A), client device B (606B), client device C (606C), client device D (606D)). The network devices (network device A (600A), network device B (600B), network device C (600C)) and client devices (client device A (606A), client device B (606B), client device C (606C), client device D (606D)) make up the IP subnet (608).

Assume for the purposes of the example, that the MAC address for network device A (600A) is "NDA:A1," the MAC address for network device B (600B) is "NDB:B2," and the MAC address for network device C (600C) is "NDC:C3." Further, assume that each client device joining the IP subnet (608) is provided the gateway IP address "1.0.1." Also assume that the MAC address for client device A (606A) is "CDA:1A," the MAC address for client device B (606B) is "CDB:2B," the MAC address for client device C (606C) is "CDC:3C," and the MAC address for client device D (606D) is "CDD:4D."

In the example, client device A (606A) previously connected to the IP subnet (608). After being authenticated by network device B (600B), client device A (606A) is provided with the gateway IP address of "1.0.1." As client device A (606A) prepares to send data to the external network (602), client device A (606A) sends an ARP request to network device B (600B). The ARP request includes the gateway IP "1.0.1" and the MAC address ("CDA:1A") of client device A (606A).

Once network device B (600B) receives the ARP request, network device B (600B) queries gateway assignment table B (604B) with the client MAC address ("CDA:1A") of client device A (606A). Network device B (600B) determines that an entry for "CDA:1A" exists in gateway assignment table B (604B), and is keyed to the MAC address "NDA:A1." Network device B (600B) then sends an ARP response to client device A (606A) with the MAC address "NDA:A1" as the gateway MAC address.

Network device B (600B) then receives an ARP request from client device B (606B). In the example, client device B (606B) is joining the IP subnet (608) for the first time. As client device B (606B) prepares to send data to the external network (602), client device B (606B) sends an ARP request to network device B (600B). The ARP request includes the gateway IP "1.0.1" and the MAC address ("CDB:2B") of client device B (606B).

Once network device B (600B) receives the ARP request, network device B (600B) queries gateway assignment table B (604B) with the client MAC address ("CDB:2B") of client device B (606B). Network device B (600B) determines that no entry for "CDB:2B" exists in gateway assignment table B (604B). Following that determination, network device B (600B) calculates its load factor. For the purposes of the example, assume the load factor is calculated as the percentage of utilization of hardware resources on the network device. Assume the load factor for network device B (600B) is currently 54%. Network device B (600B) then generates a broadcast gateway request. The broadcast gateway request includes the load factor ("54%") and the client MAC address ("CDB:2B") of client device B (606B). Network device B (600B) then sends out the broadcast gateway request to network device A (600A) and network device C (600C).

Assume that network device B (600B) receives no gateway response or gateway offer after a timeout period. Once the timeout period expires, network device B (600B) assigns itself as the gateway for client device B (606B), and stores its own MAC address ("NDB:B2") in the gateway assignment table B (604B) keyed to the MAC address ("CDB:2B") of client device B (606B). Network device B (600B) then sends an ARP response to client device B (606B) with the MAC address "NDB:B2" as the gateway MAC address.

Network device B (600B) then receives an ARP request from client device C (606C). Client device C (606C) initially connected to network device A (600A), roamed, and is now connected to network device B (600B). As client device C (606C) prepares to send data to the external network (602), client device C (606C) sends an ARP request to network device B (600B). The ARP request includes the gateway IP "1.0.1" and the MAC address ("CDC:3C") of client device C (606C).

Once network device B (600B) receives the ARP request, network device B (600B) queries gateway assignment table B (604B) with the client MAC address ("CDC:3C") of client device C (606C). Network device B (600B) determines that no entry for "CDC:3C" exists in gateway assignment table B (604B). Following that determination, network device B (600B) calculates its load factor. For the purposes of the example, assume the load factor is calculated as the percentage of utilization of hardware resources on the network device. Assume the load factor for network device B (600B) is currently 22%. Network device B (600B) then generates a broadcast gateway request. The broadcast gateway request includes the load factor ("22%") and the client MAC address ("CDC:3C") of client device C (606C). Network device B (600B) then sends out the broadcast gateway request to network device A (600A) and network device C (600C).

Network device A (600A) receives the broadcast gateway message and queries gateway assignment table A (604A) with the MAC address "CDC:3C." Network device A (600A) determines that an entry for "CDC:3C" exists in gateway assignment table A (604A) and is keyed to the MAC address ("NDA:A1") of network device A (600A). Network device A (600A) generates a gateway response with the gateway MAC address of "NDA:A1," and the sends the gateway response to network device B (600B).

Network device B (600B) receives the gateway response from network device A (600A) that includes the gateway MAC address "NDA:A1." Network device B (600B) then sends an ARP response to client device C (606C) with the MAC address "NDA:A1" as the gateway MAC address.

Network device B (600B) then receives an ARP request from client device D (606D In the example, client device D (606D) is also joining the IP subnet (608) for the first time. As client device D (606D) prepares to send data to the external network (602), client device D (606D) sends an ARP request to network device B (600B). The ARP request includes the gateway IP "1.0.1" and the MAC address ("CDD:4D") of client device D (606D).

Once network device B (600B) receives the ARP request, network device B (600B) queries gateway assignment table B (604B) with the client MAC address ("CDD:4D") of client device D (606D). Network device B (600B) determines that no entry for "CDD:4D" exists in gateway assignment table B (604B). Following that determination, network device B (600B) calculates its load factor. Assume that the load factor for network device B (600B) has increased to 77%. Network device B (600B) then generates a broadcast gateway request. The broadcast gateway request includes the load factor ("77%") and the client MAC address ("CDD:4D") of client device D (606D). Network device B (600B) then sends out the broadcast gateway request to network device A (600A) and network device C (600C).

Network device C (600C) receives the broadcast gateway message and queries gateway assignment table C (604C) with the MAC address "CDD:4D." Network device C (600C) determines that no entry for "CDD:4D" exists in gateway assignment table C (604C). Network device C (600C) then calculates its own load factor, which is currently 39%. Assume that network device C (600C) is configured such that a gateway offer is sent if the load factor of the current network device (network device C (600C)) is less than the load factor of the requesting network device (network device B (600B)). Network device C (600C) compares its load factor (39%) to the load factor of the requesting network device (77%), and determines that a gateway offer should be sent.

Network device C (600C) then generates a gateway offer with its own load factor of 39%, and sends the gateway offer to network device B (600B). Assume that network device B (600B) is configured with an assignment policy such that all gateway offers are accepted. Network device B (600B) receives the gateway offer, and assigns client device D (606D) to network device C (600C) by storing the MAC address ("CDD:4D") of client device D (606D) keyed to the MAC address ("NDC:C3") of network device C (600C) in gateway assignment table B (604B).

Network device B (600B) then sends a gateway acknowledgement to network device C (600C). Upon receiving the network acknowledgement, network device C (600C) stores the MAC address ("CDD:4D") of client device D (606D) keyed to its own MAC address ("NDC:C3") in gateway assignment table C (604C).

and is keyed to the MAC address ("NDA:A1") of network device A (600A). Network device A (600A) generates a gateway response with the gateway MAC address of "NDA:A1," and the sends the gateway response to network device B (600B).

Network device B (600B) receives the gateway response from network device A (600A) that includes the gateway MAC address "NDA:A1." Network device B (600B) then sends an ARP response to client device D (606D) with the MAC address "NDA:A1" as the gateway MAC address.

Figure 7:
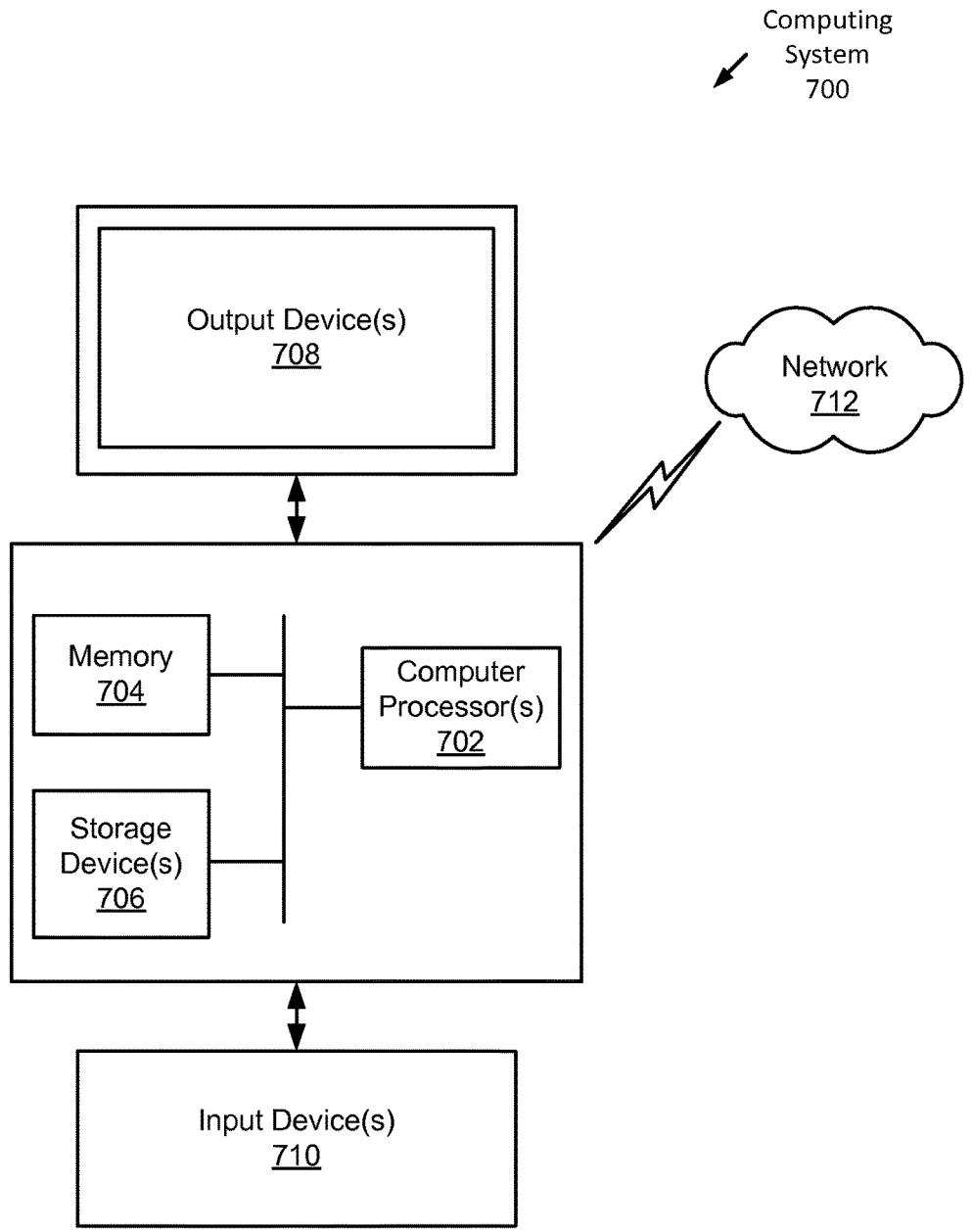
FIG. 7 shows a computer system in accordance with one or more embodiments.

Embodiments may be implemented on virtually any type of computing system regardless of the platform being used. For example, the computing system may be one or more mobile devices (for example, laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 7, the computing system (700) may include one or more computer processor(s) (702), associated memory (704) (for example, random access memory (RAM), cache memory, flash memory, etc.), one or more storage device(s) (706) (for example, a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (for example, a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (for example, a local area network (LAN), a wide area network (WAN) such as the Internet, mobile network, or any other type of network) via a network interface connection (not shown). The input and output device(s) may be locally or remotely (for example, via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (700) may be located at a remote location and connected to the other elements over a network (712). Further, embodiments may be implemented on a distributed system having a plurality of nodes, where each portion may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While embodiments have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A non-transitory computer readable medium comprising instructions executable by a processor to:
   receive, by a first network device, a request to determine a gateway Media Access Control (MAC) address for a client device;
   determine a load factor for the first network device;
   send, by the first network device, a broadcast gateway request with the first network device's load factor to determine whether the client device is assigned a gateway;
   determine that the first network device received a response to the broadcast gateway request and retrieve the gateway MAC address of the gateway assigned to the client device based on that determination;
   determine that the first network device did not receive the response to the broadcast gateway request and listen, by the first network device, for a gateway offer based on that determination;
   determine that no gateway offer was received and assign the first network device as the gateway for the client device based on that determination;
   determine that the gateway offer was received from a second network device and that a load factor of the second network device is above a threshold and assign the first network device as the gateway for the client device based on that determination; and
   determine that the load factor for the second network device is below the threshold and assign the second network device as the gateway for the client device based on that determination.

2. The medium of claim 1, wherein the first response is transmitted in response to determining that the first network device has previously been assigned to the first client device for communication by the first client device that is targeted for a particular IP address.

3. The medium of claim 1, wherein the first request is an Address Resolution Protocol (ARP) request.

4. The medium of claim 1, wherein the particular IP address is a gateway IP address associated with the particular IP subnet.

5. The medium of claim 1, further comprising instructions executable by the processor to:
   in response to transmitting the first response receive, from the first client device, a first data, wherein the first data is:
      targeted for a device corresponding to the particular IP address; and
      addressed to the first MAC address of the first network device; and
   in response to transmitting the second response, receive, from the second client device, a second data, wherein the second data is:

targeted for the device corresponding to the particular IP address; and
addressed to the second MAC address of the second network device.

6. The medium of claim 1, wherein the operation of transmitting the first response is performed by a first access point and wherein the operation of transmitting the second response is performed by a second access point that is different than the first access point.

7. The medium of claim 1, further comprising instructions executable by the processor to select, prior to transmitting the first response, the first network device for receiving data, wherein:
the data is:
transmitted by the first client device; and
targeted for a device corresponding to the particular IP address; and
selecting the first network device comprises selecting the first network device from a plurality of devices based on a current load of the first network device.

8. The medium of claim 1, further comprising instructions executable by the processor to, select the first network device for receiving data prior to transmitting the first response, wherein:
the data is transmitted by the first client device and is targeted for a device corresponding to the particular IP address; and
selecting the first network device comprises selecting the first network device from a plurality of devices based on a current load of the first network device and a current load of a particular network device that received the first request from the client device.

9. The medium of claim 1, further comprising instructions executable by the processor to select the first network device for receiving data prior to transmitting the first response, wherein:
the data is transmitted by the first client device and is targeted for a device corresponding to the particular IP address; and
selecting the first network device comprises selecting the first network device from a plurality of devices comprising the first network device and a particular network device that received the first request from the first client device.

10. The medium of claim 1, further comprising instructions executable by the processor to select the first network device for receiving data prior to transmitting the first response, wherein:
the data is transmitted by the first client device and is targeted for a device corresponding to the particular IP address; and
selecting the first network device is performed by a particular network device that received the first request from the first client device.

11. The medium of claim 1, wherein the first response is transmitted by a particular access point, and wherein the operations further comprise:
prior to the particular access point transmitting the first response:
requesting, by the particular access point from each of a plurality of access points in the particular IP subnet, information corresponding to the first client device;
receiving, by the first access point from at least the first network device, a current load of the first network device; and
based on the current load of the first network device and a current load of the first access point selecting, by the first access point, the first network device at a gateway node for the first client device.

12. A system comprising:
receive, by a first network device, a request to determine a gateway Media Access Control (MAC) address for a client device;
determine a load factor for the first network device;
send, by a first network device, a broadcast gateway request with the first network device's load factor to determine whether the client device is assigned a gateway;
determine that the first network device received a response to the broadcast gateway request and retrieve the gateway MAC address of the gateway assigned to the client device based on that determination;
determine that the first network device did not receive a response to the broadcast gateway request and listen, by a first network device, for a gateway offer based on that determination;
determine that no gateway offer was received and assign the first network device as a gateway for the client device based on that determination;
determine that a gateway offer was received from a second network device and that a load factor of the second network device is above a threshold and assign the first network device as a gateway for the client device based on that determination; and
determine that the load factor for the second network device is below the threshold and assign the second network device as the gateway for the client device based on that determination.

13. The system of claim 12, wherein the first response is transmitted in response to a determination that the first network device has previously been assigned to the first client device for communication by the first client device that is targeted for the particular IP address.

14. The system of claim 12, wherein the particular IP address is a gateway IP address associated with the particular IP subnet.

15. The system of claim 12, further comprising the system to:
receive from the first client device, in response to transmission of the first response, a first data that is targeted for a device corresponding to the particular IP address and is addressed to the first MAC address of the first network device; and
receive from the second client device, in response to transmission of the second response, a second data that is targeted for the device corresponding to the particular IP address and is addressed to the second MAC address of the second network device.

16. The system of claim 12, wherein:
a first access point transmits the first response; and
a second access point that is different than the first access point transmits the second response.

17. The system of claim 12, further comprising the system to select the first network device for receiving data prior to transmission of the first response, wherein:
the data is transmitted by the first client device and targeted for a device corresponding to the particular IP address; and
the first network device is selected from a plurality of devices based at least on a current load of the first network device.

18. The system of claim 12, further comprising the system to select the first network device for receiving data prior to transmission of the first response, wherein:

the data is transmitted by the first client device and targeted for a device corresponding to the particular IP address; and the first network device is selected from a plurality of devices based on a current load of the first network device and a current load of a particular network device that received the first request from the client device.

19. A method comprising:

receiving, by a first network device, a request to determine a gateway Media Access Control (MAC) address for a client device;

determining a load factor for the first network device;

sending, by a first network device, a broadcast gateway request with the first network device's load factor to determine whether the client device is assigned a gateway;

determining that the first network device received a response to the broadcast gateway request and retrieve the gateway MAC address of the gateway assigned to the client device based on that determination;

determining that the first network device did not receive a response to the broadcast gateway request and listen, by a first network device, for a gateway offer based on that determination;

determining that no gateway offer was received and assign the first network device as a gateway for the client device based on that determination;

determining that a gateway offer was received from a second network device and that a load factor of the second network device is above a threshold and assign the first network device as a gateway for the client device based on that determination; and determining that the load factor for the second network device is below the threshold and assign the second network device as the gateway for the client device based on that determination.

20. The method of claim 19, further comprising:

determining a load factor for the client device;

comparing the load factor for the first network device to the load factor for the client device;

determining that the load factor for the first network device is less than the load factor for the client device; and in response to the determination that the load factor for the first network device is less than the load factor for the client device, sending a gateway offer from the network device to the client.

* * * * *